US010339316B2

(12) United States Patent
Ionescu

(10) Patent No.: US 10,339,316 B2
(45) Date of Patent: Jul. 2, 2019

(54) INTEGRITY ASSURANCE THROUGH EARLY LOADING IN THE BOOT PHASE

(71) Applicant: CrowdStrike, Inc., Irvine, CA (US)

(72) Inventor: Ion-Alexandru Ionescu, Seattle, WA (US)

(73) Assignee: CrowdStrike, Inc., Irvine, CA (US)

( * ) Notice: Subject to any disclaimer, the term of this patent is extended or adjusted under 35 U.S.C. 154(b) by 46 days.

(21) Appl. No.: 14/810,840

(22) Filed: Jul. 28, 2015

(65) Prior Publication Data

US 2017/0061127 A1    Mar. 2, 2017

(51) Int. Cl.
*G06F 12/14*    (2006.01)
*G06F 21/57*    (2013.01)

(52) U.S. Cl.
CPC .................. *G06F 21/575* (2013.01)

(58) Field of Classification Search
CPC ..................................... G06F 21/575
USPC ............................ 726/23, 22–24; 713/189
See application file for complete search history.

(56) References Cited

U.S. PATENT DOCUMENTS

| | | | |
|---|---|---|---|
| 5,355,498 A * | 10/1994 | Provino | G06F 9/4406 713/2 |
| 6,009,274 A | 12/1999 | Fletcher et al. | |
| 6,052,723 A | 4/2000 | Ginn | |
| 6,088,804 A | 7/2000 | Hill et al. | |
| 6,463,584 B1 | 10/2002 | Gard et al. | |
| 7,093,116 B2 * | 8/2006 | Chen | G06F 9/4411 713/1 |
| 7,099,948 B2 | 8/2006 | Tormasov et al. | |
| 7,281,268 B2 | 10/2007 | Hollander et al. | |

(Continued)

FOREIGN PATENT DOCUMENTS

| | | |
|---|---|---|
| EP | 0648353 A1 | 4/1995 |
| JP | 2004293368 | 10/2004 |

(Continued)

OTHER PUBLICATIONS

The Partial Supplementary European Search Report dated Jan. 25, 2016 for European Patent Application No. 13808592.3, 6 pages.

(Continued)

*Primary Examiner* — Amare F Tabor
(74) *Attorney, Agent, or Firm* — Lee & Hayes, P.C.

(57) ABSTRACT

Techniques utilizing library and pre-boot components to ensure that a driver associated with a kernel-mode component is initialized before other drivers during a boot phase are described herein. The library component is processed during a boot phase; the pre-boot component, which may be an alternative to the library component, is processed during a pre-boot phase. By ensuring that the driver is the first driver initialized, the components enable the driver to launch the kernel-mode component before other drivers are initialized. The library component may also determine whether another driver is to be initialized before the kernel-mode component driver, may ensure that kernel-mode component driver is initialized first, and may alert the kernel-mode component. Also, the library component may retrieve information that is to be deleted by the operating system before initialization of drivers and may provide that information to the kernel-mode component.

28 Claims, 8 Drawing Sheets

(56) References Cited

U.S. PATENT DOCUMENTS

| | | | |
|---|---|---|---|
| 7,366,891 B2* | 4/2008 | Khanna | G06F 9/4403 712/43 |
| 7,441,113 B2* | 10/2008 | Chong | G06F 9/4401 713/1 |
| 7,478,237 B2 | 1/2009 | Costea et al. | |
| 7,512,810 B1 | 3/2009 | Ryan | |
| 7,571,448 B1 | 8/2009 | Sallam | |
| 7,765,400 B2 | 7/2010 | Costea et al. | |
| 7,765,410 B2 | 7/2010 | Costea et al. | |
| 7,890,664 B1 | 2/2011 | Tao et al. | |
| 7,908,656 B1 | 3/2011 | Mu | |
| 8,065,728 B2 | 11/2011 | Wang et al. | |
| 8,086,836 B2* | 12/2011 | Chong | G06F 9/4401 712/32 |
| 8,190,868 B2* | 5/2012 | Schneider | G06F 21/566 713/164 |
| 8,220,041 B2* | 7/2012 | Boyce | G06F 21/51 713/2 |
| 8,234,693 B2 | 7/2012 | Stahl et al. | |
| 8,239,947 B1 | 8/2012 | Glick et al. | |
| 8,321,677 B2 | 11/2012 | Morten | |
| 8,407,279 B2 | 3/2013 | Kang | |
| 8,407,698 B2* | 3/2013 | Lee | G06F 9/45504 709/220 |
| 8,413,261 B2 | 4/2013 | Nemoy et al. | |
| 8,510,570 B2* | 8/2013 | Smith | G06F 21/575 713/190 |
| 8,533,830 B1* | 9/2013 | Dalcher | G06F 21/564 713/189 |
| 8,539,584 B2 | 9/2013 | Ramalingam | |
| 8,549,648 B2* | 10/2013 | Sallam | G06F 21/554 726/24 |
| 8,572,247 B2 | 10/2013 | Larson et al. | |
| 8,572,733 B1 | 10/2013 | Rockwood | |
| 8,577,616 B2 | 11/2013 | Dunlap | |
| 8,578,477 B1 | 11/2013 | Lin et al. | |
| 8,631,488 B2* | 1/2014 | Oz | G06F 21/57 726/22 |
| 8,762,298 B1 | 6/2014 | Ranjan et al. | |
| 8,776,227 B1 | 7/2014 | Glick et al. | |
| 8,789,034 B1 | 7/2014 | Emelyanov et al. | |
| 9,038,176 B2* | 5/2015 | Sallam | G06F 21/554 718/1 |
| 9,043,903 B2* | 5/2015 | Diehl | G06F 9/46 726/22 |
| 9,158,914 B2* | 10/2015 | Ionescu | G06F 21/54 |
| 9,317,687 B2* | 4/2016 | Edwards | G06F 21/566 |
| 9,571,453 B2 | 2/2017 | Diehl et al. | |
| 9,606,809 B2* | 3/2017 | Zhang | G06F 9/4401 |
| 9,621,515 B2 | 4/2017 | Diehl et al. | |
| 2001/0044904 A1 | 11/2001 | Berg et al. | |
| 2002/0023211 A1 | 2/2002 | Roth et al. | |
| 2003/0112781 A1 | 6/2003 | Kermode et al. | |
| 2004/0107416 A1 | 6/2004 | Buban et al. | |
| 2005/0159998 A1 | 7/2005 | Buyukkokten et al. | |
| 2006/0156380 A1 | 7/2006 | Gladstone et al. | |
| 2006/0174323 A1 | 8/2006 | Brown et al. | |
| 2007/0022287 A1 | 1/2007 | Beck et al. | |
| 2007/0094496 A1 | 4/2007 | Burtscher | |
| 2007/0143850 A1 | 6/2007 | Kraemer et al. | |
| 2007/0250817 A1 | 10/2007 | Boney | |
| 2008/0034429 A1 | 2/2008 | Schneider | |
| 2008/0126806 A1 | 5/2008 | Morten | |
| 2008/0189796 A1 | 8/2008 | Linn et al. | |
| 2008/0209505 A1 | 8/2008 | Ghai et al. | |
| 2008/0253287 A1 | 10/2008 | Gupta et al. | |
| 2008/0282198 A1 | 11/2008 | Brooks et al. | |
| 2008/0301669 A1 | 12/2008 | Rao et al. | |
| 2009/0070878 A1 | 3/2009 | Wang et al. | |
| 2009/0094039 A1 | 4/2009 | MacDonald et al. | |
| 2009/0119681 A1 | 5/2009 | Bhogal et al. | |
| 2009/0216806 A1 | 8/2009 | Feuerstein et al. | |
| 2009/0307142 A1 | 12/2009 | Mardikar | |
| 2010/0074446 A1 | 3/2010 | Fuchs et al. | |
| 2010/0169973 A1 | 7/2010 | Kim et al. | |
| 2010/0212012 A1* | 8/2010 | Touboul | G06F 21/554 726/23 |
| 2010/0235622 A1 | 9/2010 | Robinton et al. | |
| 2010/0235879 A1 | 9/2010 | Burnside et al. | |
| 2010/0312890 A1 | 12/2010 | Bernosky | |
| 2011/0029772 A1 | 2/2011 | Fanton et al. | |
| 2011/0099632 A1 | 4/2011 | Beck et al. | |
| 2011/0145598 A1 | 6/2011 | Smith et al. | |
| 2011/0209219 A1 | 8/2011 | Zeitlin et al. | |
| 2011/0239306 A1 | 9/2011 | Avni et al. | |
| 2012/0005542 A1 | 1/2012 | Petersen et al. | |
| 2012/0079594 A1 | 3/2012 | Jeong et al. | |
| 2012/0084799 A1 | 4/2012 | Sallam | |
| 2012/0167161 A1 | 6/2012 | Kim | |
| 2012/0246297 A1 | 9/2012 | Shanker et al. | |
| 2012/0255002 A1 | 10/2012 | Sallam | |
| 2012/0255012 A1 | 10/2012 | Sallam | |
| 2013/0145465 A1 | 6/2013 | Wang et al. | |
| 2013/0291112 A1 | 10/2013 | Shue et al. | |
| 2013/0305340 A1 | 11/2013 | Wotring | |
| 2013/0312095 A1 | 11/2013 | Edwards et al. | |
| 2013/0333040 A1 | 12/2013 | Diehl et al. | |
| 2014/0007190 A1 | 1/2014 | Alperovitch et al. | |
| 2014/0109226 A1 | 4/2014 | Diehl et al. | |
| 2014/0317405 A1 | 10/2014 | Johnson et al. | |
| 2015/0007316 A1 | 1/2015 | Ben-Shalom et al. | |
| 2015/0101044 A1 | 4/2015 | Martin et al. | |
| 2015/0128206 A1 | 5/2015 | Ben Haim et al. | |
| 2015/0178071 A1 | 6/2015 | Pavlik et al. | |
| 2015/0244679 A1 | 8/2015 | Diehl et al. | |
| 2015/0256552 A1* | 9/2015 | Lee | G06F 21/566 726/24 |
| 2015/0268947 A1 | 9/2015 | Ionescu | |
| 2015/0326614 A1 | 11/2015 | Alperovitch et al. | |
| 2015/0356301 A1 | 12/2015 | Diehl et al. | |
| 2016/0170740 A1 | 6/2016 | Ionescu | |
| 2017/0109530 A1 | 4/2017 | Diehl et al. | |
| 2017/0213031 A1 | 7/2017 | Diehl et al. | |
| 2018/0239657 A1 | 8/2018 | Petrbok et al. | |

FOREIGN PATENT DOCUMENTS

| | | |
|---|---|---|
| JP | 2006065835 | 3/2006 |
| JP | 2006134307 | 5/2006 |
| JP | 2008507757 | 3/2008 |
| JP | 2009206849 | 9/2009 |
| JP | 2009238153 | 10/2009 |
| JP | 2009238632 | 10/2009 |
| JP | 2010517164 | 5/2010 |
| JP | 2010177767 | 8/2010 |
| JP | 2010182019 | 8/2010 |
| JP | 2013502005 | 1/2013 |
| KR | 1020100085424 A | 7/2010 |
| KR | 101038048 | 6/2011 |
| WO | 2006023685 | 3/2006 |
| WO | WO2012107557 | 8/2012 |
| WO | WO2012135192 | 10/2012 |
| WO | WO2013164821 | 11/2013 |

OTHER PUBLICATIONS

The Supplementary Extended European Search Report dated Feb. 16, 2016 for European patent application No. 1380051934, 22 pages.

Office action for U.S. Appl. No. 14/709,779, dated Feb. 23, 2016, Diehl et al., "Kernel-Level Security Agent", 14 pages.

Translated Singapore Office Action dated Nov. 17, 2015 for Singapore patent application No. 11201408279Q, a counterpart foreign application of U.S. Appl. No. 13/538,439, 6 pages.

The Supplementary European Search Report dated Nov. 3, 2015 for European Patent Application No. 13800519.4, 7 pages.

Translated Singapore Office Action dated Sep. 28, 2015 for Singapore patent application No. 11201407292Q, a counterpart foreign application of U.S. Pat. No. 9,043,903, 6 pages.

Office Action for U.S. Appl. No. 14/140,323, dated Jul. 31, 2015, David F. Diehl, "Kernel-Level Security Agent", 9 pages.

(56) References Cited

OTHER PUBLICATIONS

The Extended European Search Report dated Dec. 6, 2016 for European patent application No. 16179598.4, 7 pages.
Office action for U.S. Appl. No. 14/792,177, dated Dec. 16, 2016, Alperovitch et al., "Social Sharing of Security Information in a Group", 12 pages.
Office action for U.S. Appl. No. 15/051,461, dated Dec. 8, 2016, Ionescu, "Integrity Assurance and Rebootless Updating During Runtime", 9 pages.
Office action for U.S. Appl. No. 14/220,362, dated Feb. 7, 2017, Ionescu, "Integrity Assurance and Rebootless Updating During Runtime", 16 pages.
The Extended European Search Report dated Jun. 2, 2016 for European patent application No. 13808592.3, 12 pages.
Office action for U.S. Appl. No. 14/140,323, dated May 11, 2016, Diehl et al., "Kernel-Level Security Agent", 15 pages.
Office action for U.S. Appl. No. 14/220,362, dated May 25, 2016, Ionescu, "Integrity Assurance and Rebootless Updating During Runtime", 12 pages.
Office action for U.S. Appl. No. 14/792,177, dated Jun. 30, 2016, Alperovitch et al., "Social Sharing of Security Information in a Group", 11 pages.
Office action for U.S. Appl. No. 14/709,779, dated Aug. 12, 2016, Diehl et al., "Kernel-Level Security Agent", 7 pages.
Office action for U.S. Appl. No. 14/220,362, dated Sep. 16, 2016, Ionescu, "Integrity Assurance and Rebootless Updating During Runtime", 14 pages.
Popenko, S. et al., "Driver to Hide Processes and Files", CodeProject, Aug. 17, 2009, 26 pgs.
King et al, "Backtracking Intrusions", ACM SOSP, Oct. 2003, vol. 37, Issue 5, 14 pgs.
Final Office Action for U.S. Appl. No. 13/492,672, dated Oct. 23, 2014, David F. Diehl, "Kernel-Level Security Agent", 15 pages.
Final Office Action for U.S. Appl. No. 13/538,439, dated Dec. 2, 2014, Dmitri Alperovitch, "Social Sharing of Security Information in a Group", 13 pages.
Final Office Action for U.S. Appl. No. 13/728,746, dated Dec. 3, 2014, David F. Diehl, "Real-Time Representation of Security-Relevant System State", 22 pages.
Office Action for U.S. Appl. No. 13/728,746, dated Apr. 14, 2014, David F. Diehl, "Real-Time Representation of Security-Relevant System State", 17 pages.
Office Action for U.S. Appl. No. 13/538,439, dated Apr. 23, 2015, Dmitri Alperovitch, "Social Sharing of Security Information in a Group", 6 pages.
Office Action for U.S. Appl. No. 13/492,672, dated Apr. 7, 2014, David F. Diehl, "Kernel-Level Security Agent", 8 pages.
Office action for U.S. Appl. No. 13/538,439, dated Jun. 30, 2014, Alperovitch et al., "Social Sharing of Security Information in a Group", 13 pages.
The PCT Search Report and Written Opinion dated Apr. 28, 2015 for PCT application No. PCT/US2015/013522, 13 pages.
The PCT Search Report and Written Opinion dated Apr. 29, 2014 for PCT application No. PCT/US13/75856, 13 pages.
The PCT Search Report and Written Opinion dated Jun. 1, 2015 for PCT application No. PCT/US2015/020187, 13 pages.
The PCT Search Report and Written Opinion dated Sep. 17, 2013 for PCT application No. PCT/US2013/040420 , 12 pages.
The PCT Search Report and Written Opinion dated Sep. 26, 2013 for PCT Application No. PCT/US13/40428, 13 pages.
The European Office Action dated Sep. 11, 2017 for European Patent Application No. 16179598.4, a counterpart foreign application of U.S. Appl. No. 14/810,840, 4 pages.
Translated Israeli Office Action dated Aug. 30, 2017 for Israeli patent application No. 235905, a counterpart foreign application of U.S. Pat. No. 9,043,903, 5 pages.
Translated Japanese Office Action dated Mar. 21, 2017 for Japanese patent application No. 2015-520185, a counterpart foreign application of U.S. Pat. No. 9,292,881, 11 pages.
Translated Japanese Office Action dated Apr. 25, 2017 for Japanese Patent Application No. 2015-516024, a counterpart foreign application of U.S. Pat. No. 9,043,903, 22 pages.
Office action for U.S. Appl. No. 15/393,797, dated Apr. 18, 2017, Diehl et al., "Security Agent", 15 pages.
Office action for U.S. Appl. No. 15/051,461, dated Jun. 1, 2017, Ionescu, "Integrity Assurance and Rebootless Updating During Runtime", 11 pages.
Office action for U.S. Appl. No. 14/792,177, dated Jun. 15, 2017, Alperovitch et al., "Social Sharing of Security Information in a Group", 14 pages.
Office Action for U.S. Appl. No. 15/483,153, dated Jun. 29, 2017, Diehl et al., "Kernel-Level Security Agent", 12 pages.
The Australian Office Action dated Jan. 22, 2018 for Australian Patent Application No. 2013272198, a counterpart foreign application of U.S. Pat. No. 9,043,903, 5 pages.
The Australian Office Action dated Nov. 30, 2017 for Australian patent application No. 2013281175, a counterpart foreign application of U.S. Pat. No. 9,292,881, 4 pages.
The European Office Action dated Nov. 22, 2017 for European patent application No. 13800519.4, a counterpart foreign application of U.S. Pat. No. 9,043,903, 7 pgaes.
The Extended European Search Report dated Jan. 22, 2018 for European Patent Application No. 15764091.3, 11 pages.
The Partial Supplementary European Search Report dated Oct. 12, 2017 for European Patent Application No. 15764091.3, 13 pages.
The Israeli Office Action dated Sep. 11, 2017 for Israeli patent application No. 236390, a counterpart foreign application of U.S. Pat. No. 9,292,881, 7 pages.
Office action for U.S. Appl. No. 15/393,797, dated Oct. 30, 2017, Diehl et al., "Security Agent", 10 pages.
Office Action for U.S. Appl. No. 15/051,461, dated Nov. 15, 2017, Ionescu, "Integrity Assurance and Rebootless Updating During Runtime", 9 pages.
Office action for U.S. Appl. No. 14/220,362, dated Nov. 7, 2017, Ionescu, "Integrity Assurance and Rebootless Updating During Runtime", 16 pages.
Chiueh, et al, "Stealthy Deployment and Execution of In-Guest Kernel Agents", The Black Hat Technical Security Conference USA, 2009, pp. 1-pp. 12.
Translated Japanese Office Action dated Feb. 20, 2018 for Japanese Patent Application No. 2015-520185, a counterpart foreign application of U.S. Pat. No. 9,292,881, 9 pages.
Office action for U.S. Appl. No. 15/051,461, dated Mar. 15, 2018, Ionescu, "Integrity Assurance and Rebootless Updating During Runtime", 12 pages.
The European Office Action dated Aug. 7, 2018, for European patent application No. 13808592.3, a counterpart foreign application of U.S. Pat. No. 9,292,881, 6 pages.
IDG Communications, "Symantec adds New Protection Features to Its Conusmer and Enterprise Antivirus Solutions", Jan. 19, 2006, 5 pages.
Messmer, "Are all rootkits evil? Settlement in Sony CD case resurrects old debate.", retrieved on Aug. 11, 2018 from https://www.networld.com/article/2312244/lan-wan/are-all-rootkits-evil.html, May 23, 2006, 4 pages.
Office action for U.S. Appl. No. 15/051,461, dated Aug. 16, 2018, Ionescu, "Integrity Assurance and Rebootless Updating During Runtime", 11 pages.
Office action for U.S. Appl. No. 14/220,362, dated Aug. 23, 2018, Ionescu, "Integrity Assurance and Rebootless Updating During Runtime", 14 pages.
The Japanese Office Action dated Jan. 8, 2019 for Japanese Patent Application No. 2017-177787, a counterpart of U.S. Pat. No. 9,043,903, 7 pages.
U.S. Office Action dated Jan. 18, 2019 for U.S. Appl. No. 15/051,461 "Integrity Assurance and Rebootless Updating During Runtime" Ionescu, 9 pages.
The Japanese Office Action dated Jan. 29, 2019 for Japanese Patent Application No. 2016-557973, a counterpart of U.S. Appl. No. 14/220,362, 7 pages.

* cited by examiner

INTEGRITY ASSURANCE THROUGH EARLY LOADING IN THE BOOT PHASE

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

To compromise security software or to gain control of a computing device regardless of the presence of security software, security exploits are often designed to launch early in a boot phase of a computing device. A security exploit may accomplish this by modifying a driver initialization order used by an operating system during the boot phase to place a driver associated with the security exploit first in a list of drivers initialized by the operating system. When initialized, the security exploit driver may launch the security exploit.

Also, security software may monitor the loading of drivers by an operating system kernel, which may notify the security software when drivers are loaded. In some operating systems, however, some drivers, referred to as "boot drivers," may be loaded by a boot loader, and those operating systems may not notify the security software of the loading of the boot drivers. Thus, a security exploit posing as a boot driver that is loaded by a boot loader during a boot phase may escape detection by security software.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
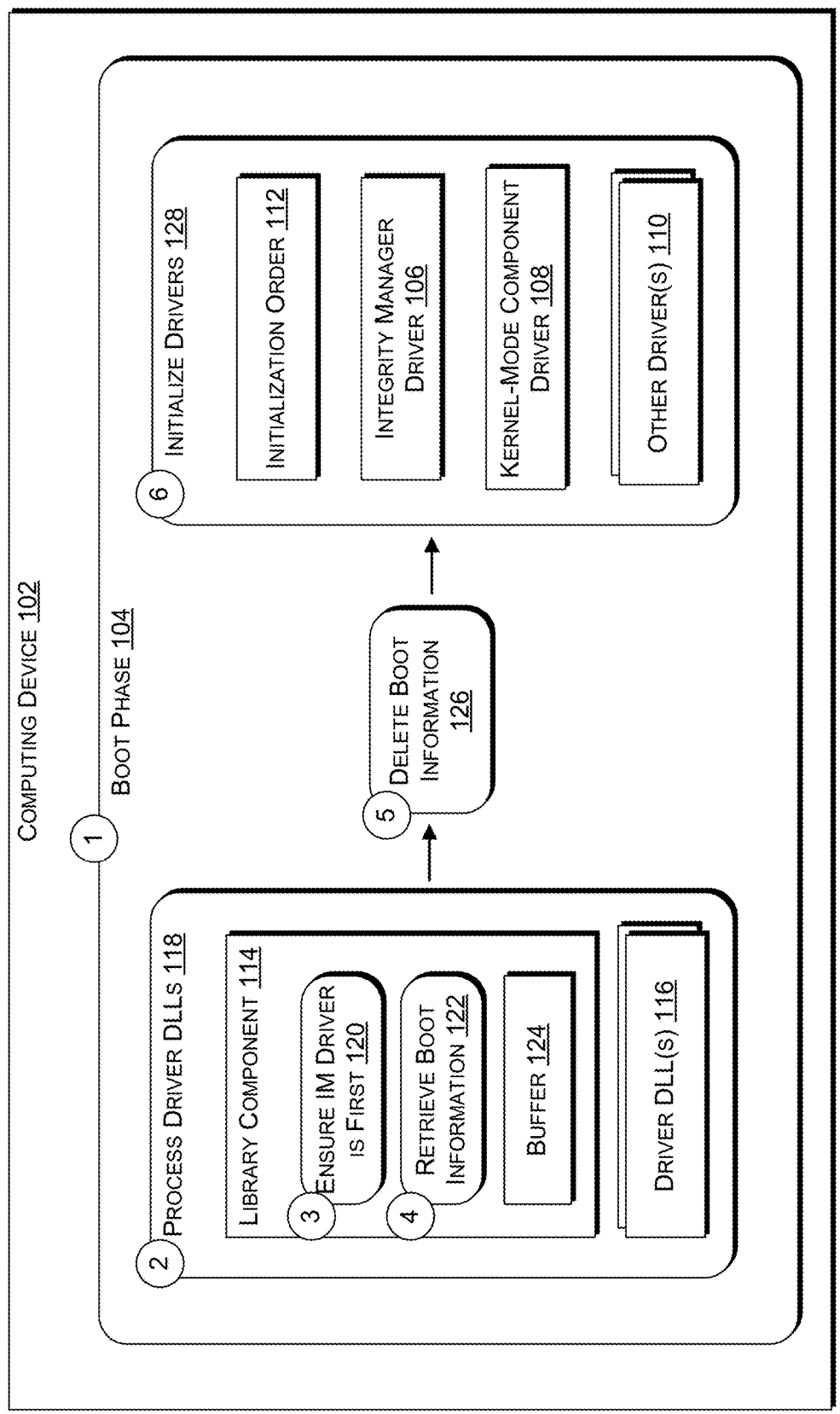
FIG. 1 illustrates an example boot phase of a computing device in which a library component associated with a kernel-mode component is processed before drivers are initialized, ensuring that a driver component associated with the kernel-mode component is initialized before other drivers.

This disclosure describes, in part, techniques that utilize library and pre-boot components to ensure that a driver associated with a kernel-mode component is initialized before other drivers during a boot phase. The library component is processed during a boot phase; the pre-boot component, which may be an alternative to the library component, is processed during a pre-boot phase. By ensuring that the driver is the first driver initialized, the components enable the driver to launch the kernel-mode component before other drivers are initialized.

In various embodiments, the library component may be a dependent dynamic link library (DLL) of a driver of an integrity manager associated with the kernel-mode component. The integrity manager may be a component responsible for assuring the integrity of the kernel-mode component, both during a boot phase and at runtime. The library component is processed along with other dependent DLLs of other drivers before any drivers are initialized by the operating system. The library component and other dependent DLLs may be processed in an alphabetical order of their names, which may be constituted by ASCII or Unicode characters. When processed, the library component ensures that a driver component associated with the kernel-mode component, such as an integrity manager driver, is a first driver initialized by the operating system. This may involve checking an initialization order utilized by the operating system for drivers and, if the driver component is not placed first in the initialization order, updating the initialization order to place the driver component first in that initialization order to ensure that the driver component is processed first. In some embodiments, in addition to ensuring that the driver component is initialized first, the library component causes the driver component to be initialized before other DLLs are processed. Also, when processed, the library component may decrypt an executable for either or both of the integrity manager or the kernel-mode component.

The operating system may then initialize drivers in the order specified in the initialization order, beginning with the driver component. When initialized, the integrity manager driver component (also referred to herein as the "driver component") may launch the integrity manager, and the integrity manager may ensure that the next driver in the initialization order is the kernel-mode component driver. The operating system may then initialize the kernel-mode component driver, causing the kernel-mode component driver to launch the kernel-mode component.

In some embodiments, where a pre-boot component is used, the pre-boot environment, such as a basic input output system (BIOS), may have an interface that enables the pre-boot environment to be provided with components, such as the pre-boot component. That interface may in turn utilize one or more security measures.

As mentioned above, when the integrity manager is launched by the integrity manager driver, the integrity manager may determine whether the kernel-mode component driver is the next driver in the initialization order. If the kernel-mode component driver is not the next driver, the integrity manager alters the initialization order to place the kernel-mode component driver as the first driver after the integrity manager driver and, once the kernel-mode component is launched, alerts the kernel-mode component that the kernel-mode component driver was not first and had to be placed first in the initialization order by the integrity manager. Upon receiving the alert, the kernel-mode component may update configuration, perform additional monitoring, take healing action(s), or notify a remote security service. During a previous runtime, the kernel-mode component may have placed its driver first in the initialization order and intercepted and altered requests from other applications or processes for their drivers to be placed first. If the kernel-mode component driver was not first, then malicious activity, such as a security exploit, may be the cause.

In various embodiments, the library component may also retrieve information that is to be deleted by the operating system before initialization of drivers. Such information may be boot information. For example, the boot information may be boot information associated with a boot loader and retrieved from a loader parameter block of the boot loader. Examples of information may include a list of the drivers, an initialization order of the drivers, BIOS information, a memory layout, trusted platform module (TPM) information, or a random number generator seed. Alternatively or additionally, the information may include a list of boot drivers and copies of the boot drivers. The library component may store the retrieved information in a buffer of the library component. Once the integrity manager is launched, it may retrieve the information from the library component and may provide the information to the kernel-mode component once the kernel-mode component is launched.

Example Boot Phase

FIG. 1 illustrates an example boot phase of a computing device in which a library component associated with a kernel-mode component is processed before drivers are initialized, ensuring that a driver component associated with the kernel-mode component is initialized before other drivers. FIG. 1 illustrates both hardware and software components and processes or operations. The processes or operations are shown numbered in FIG. 1, in order of their occurrence.

As illustrated, a computing device 102 may start a boot phase 104 after a power cycle or reboot. Both an integrity manager driver 106 of an integrity manager and a kernel-mode component driver 108 of a kernel-mode component are initialized early in the boot phase 104, causing the integrity manager and kernel-mode component to be launched before other drivers 110 are initialized by an operating system of the computing device 102. The operating system may initialize the drivers in an order specified by the initialization order 112. To ensure that the integrity manager driver 106 is first in the initialization order 110, the integrity manager driver 106 may be associated with a library component 114, such as a dependent DLL, that, along with other dependent DLLs 116 of other drivers, are processed before any drivers are initialized by the operating system.

As shown, during a first part of the boot phase 104, the DLLs may be processed 118. This processing 118 includes processing the library component 114 which in turn ensures 120 that the integrity manager driver 106 is first in the initialization order 110 and retrieves 122 information that is to be deleted by the operating system. This information is then stored in a buffer 124 of the library component 114. Next, during a second part of the boot phase 104, the operating system deletes 126 the boot information that was retrieved 122 by the library component 114. After that, during a third part of the boot phase 104, the operating system initializes 128 the drivers in accordance with the initialization order 112.

Figure 4:
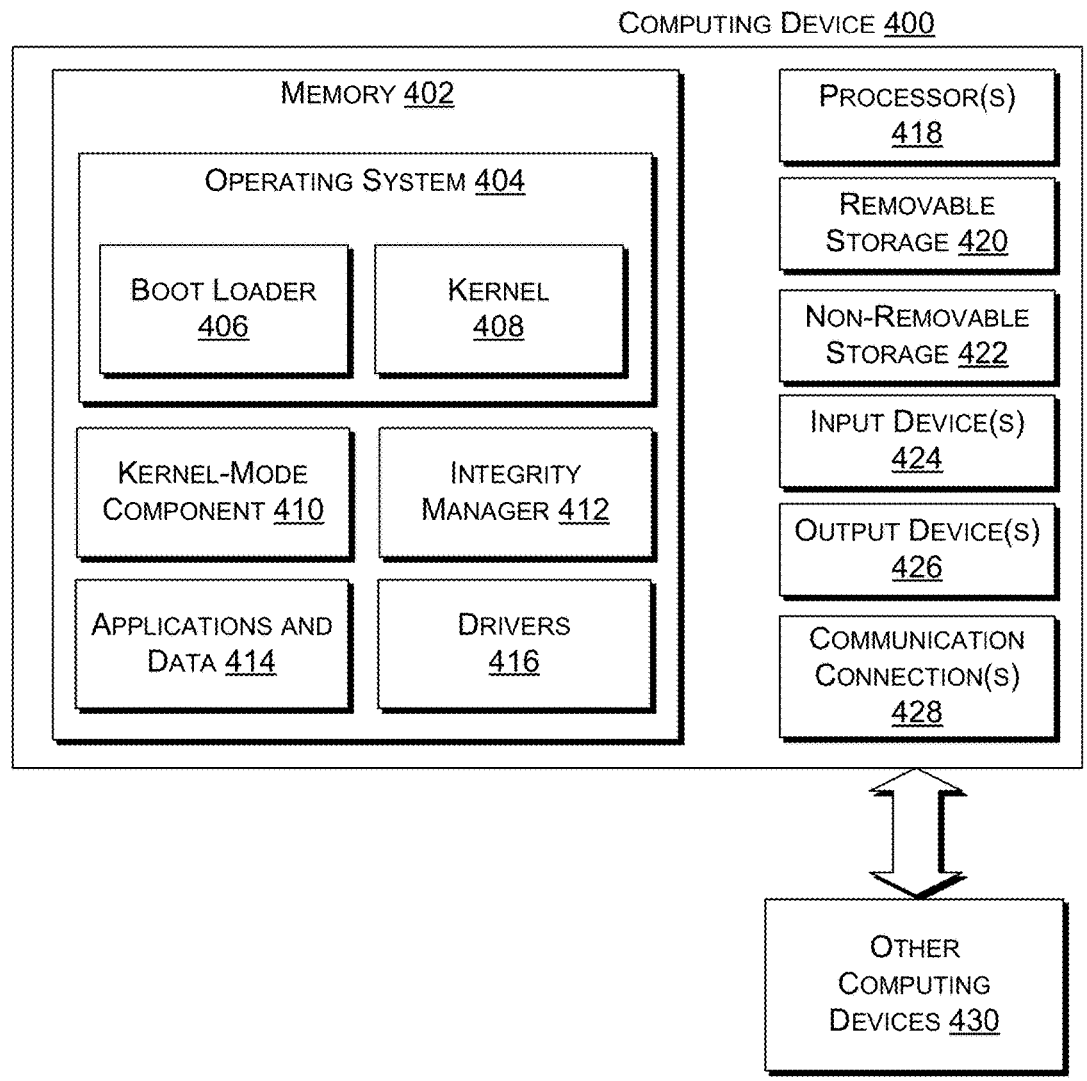
FIG. 4 illustrates a component level view of a computing device configured with a kernel-mode component and with an integrity manager associated with the kernel-mode component.

In various embodiments, the computing device 102 may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the computing device 102 may distribute the components and processes illustrated in FIG. 1 among the multiple computing devices. In some implementations, the computing device 102 represents one or more virtual machines implemented on one or more computing devices. An example computing device capable of serving as a computing device 102 is illustrated in FIG. 4 and described below with reference to that figure.

The boot phase 104 may be part of a booting process of the computing device 102 following a power cycle or reboot. The boot phase 104 may follow a pre-boot phase and may involve a number of operations in which a boot loader and a kernel of an operating system of the computing device 102 load and initialize computing device components such as drivers. In a first part of the boot phase 104, the operating system may process 118 dependent DLLs of drivers, such as library component 114 and other dependent DLLs 116. This processing 118 may follow loading of drivers and their DLLs into memory of the computing device 102. After processing 118 the dependent DLLs, the operating system deletes 126 boot information. The operating system then proceeds to initialize 128 the drivers. The boot phase 104 may also involve other stages or operations besides those illustrated and described. Following the boot phase 104, the computing device 102 may enter into a runtime phase in which the operating system and various components and applications have launched and are running as active processes.

As mentioned, the library component 114 may be a dependent DLL of the integrity manager driver 106. Dependent DLLs 114 and 116 are executables themselves, and the operating system may process the dependent DLLs for drivers before initializing the drivers to prevent the drivers which call the dependent DLLs from crashing. While the drivers are initialized in accordance with an initialization order 112, their associated dependent DLLs may be processed in a different order. For example, the dependent DLLs may be processed in the alphabetical order of their associated names, which may be ASCII character strings. In such embodiments, the library component 114 may have a name which causes it to be processed before the other dependent DLLs 116.

In various embodiments, when the library component 114 is processed 118, it may perform a number of operations, including ensuring 120 that the integrity manager driver 106 is first in the initialization order 112, retrieving 122 information that is to be deleted, such as boot information, and storing that boot information in a buffer of the library component 114. To ensure 120 that the integrity manager driver 106 is first in the initialization order 112, the library component 112 may alter the initialization order 112 to place the integrity manager driver 106 first. In some embodiments, in addition to or instead of altering the initialization order 112, the library component 114 may cause the operating system to initialize the integrity manager driver 106, the integrity manager driver 106 launching the integrity manager, which may in turn launch the kernel-mode component, all before other dependent DLLs are processed.

Retrieving 122 the information may include retrieving 122 boot information associated with a boot loader and retrieved from a loader parameter block of the boot loader. Examples of information retrieved 122 by the library component 114 may include a list of the drivers, an initialization order of the drivers, BIOS information, a memory layout, TPM information, or a random number generator seed. Alternatively or additionally, the information may include a list of boot drivers and copies of the boot drivers.

After the processing 118 the dependent DLLs and deleting 126 the boot information, the operating system initializes the drivers based on the initialization order 112. The initialization order 112 may be any sort of structure, file, or even a database, and the drivers may be executable components of the operating system or of a computing device application which may launch components of the operating system or applications as active processes. Because of the activity of the library component 114, the integrity manager driver 106 may be the first driver in the initialization order 112 and may thus be initialized before other drivers.

When the operating system initializes the integrity manager driver 106, the integrity manager driver 106 launches the integrity manager before other drivers are initialized. As mentioned above, the integrity manager may be a component responsible for assuring the integrity of the kernel-mode component, both during the boot phase 104 and at runtime. The integrity manager may be a single component or may be a combination of components with the same title/job/behavior. The integrity manager may then determine whether the kernel-mode component driver 108 is the next driver in the initialization order after the integrity manager driver 106. If the kernel-mode component driver 108 is not the next driver, the integrity manager alters the initialization order 112 to place the kernel-mode component driver 108 as the next driver. Also, if the integrity manager has to alter the initialization order 112, the integrity manager generates an alert and provides that alert to the kernel-mode component once the kernel-mode component has launched. Because of runtime activity of the kernel-mode component described herein with respect to FIG. 3, the kernel-mode component driver 108 should be next, before other drivers 110 and the integrity manager should not have to alter the initialization order 112. If it does have to alter the initialization order, this may indicate malicious activity. Further, after launching, the integrity manager may retrieve the information stored in the buffer 124 of the library component 114.

In various implementations, the integrity manager driver 106 may comprise multiple subcomponents. For example, the integrity manager driver 106 may include an unloadable part, which may be unloaded and updated without requiring a reboot of the computing device 102, and a non-unloadable part. Updates to the non-unloadable part of the integrity manager driver 106 may require a reboot of the computing device. Also, the integrity manager driver 106 may include a third part which is loaded first, before the unloadable and non-unloadable parts. This third part may be the component placed first in the initialization order 112 by the library component 114, as described above. The third part then may ensure that the unloadable and non-unloadable parts of the integrity manager driver 106 are initialized before other drivers.

In some embodiments, the operating system then initializes the kernel-mode component driver 108. When the kernel-mode component driver 108 is initialized, the kernel-mode component driver 108 launches the kernel-mode component before other drivers 110 are initialized. The kernel-mode component may monitor activity of the computing device 102, determine whether activity indicates the installation or operation of a security exploit, and takes some action based on the determination. The kernel-mode component may receive alerts and information from the integrity manager over a communication channel and operate as an active process.

In various embodiments, after the integrity manager driver 106 and kernel-mode component driver 108 are initialized and the integrity manager and kernel-mode component are launched, the operating system initializes the other drivers 110 based on the initialization order 112.

Example Pre-Boot and Boot Phases

Figure 2:
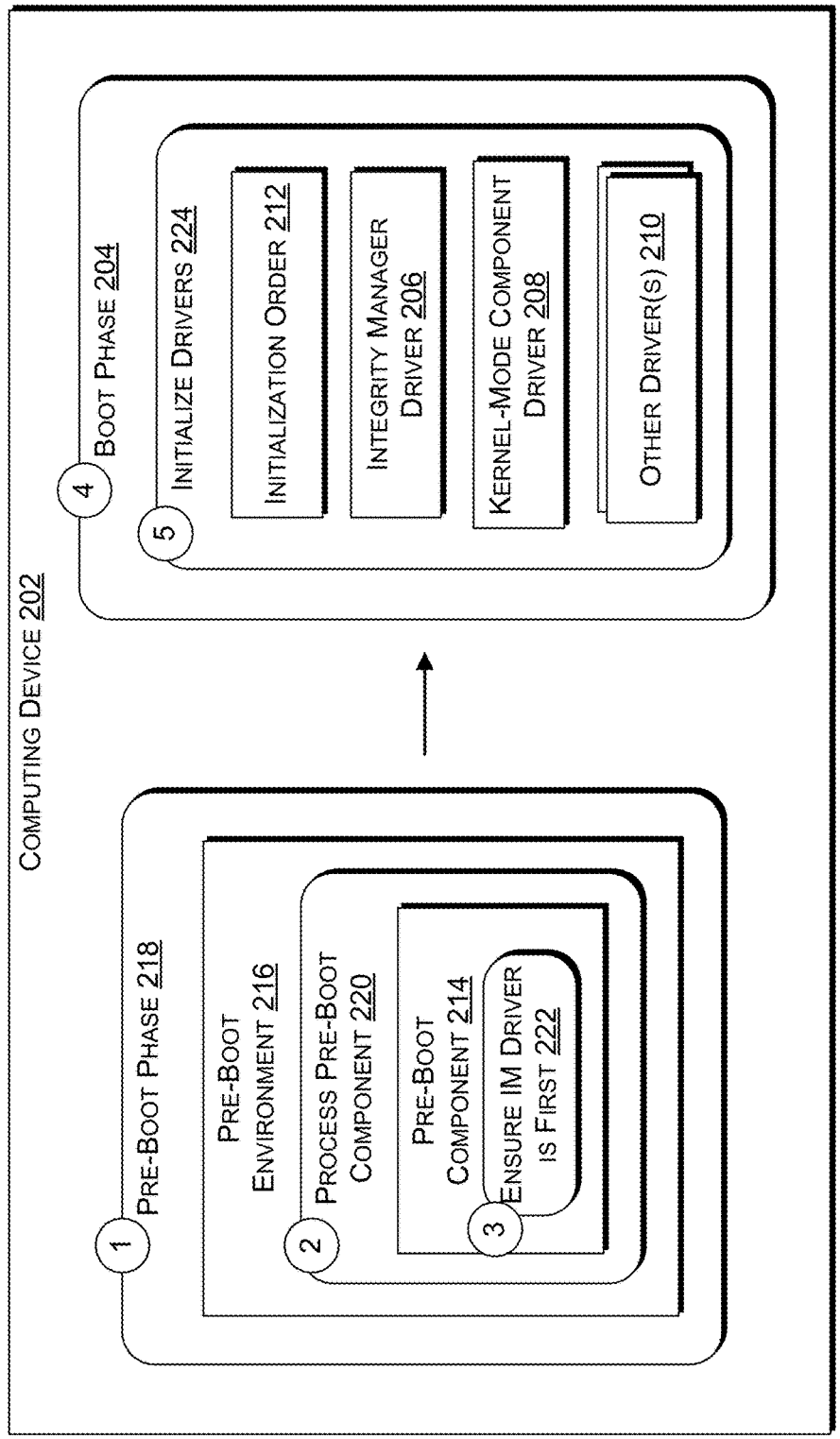
FIG. 2 illustrates example pre-boot and boot phases of a computing device in which a pre-boot component associated with a kernel-mode component is processed in the pre-boot phase, the pre-boot component ensuring that a driver component associated with the kernel-mode component is initialized before other drivers.

FIG. 2 illustrates example pre-boot and boot phases of a computing device in which a pre-boot component associated with a kernel-mode component is processed in the pre-boot phase, the pre-boot component ensuring that a driver component associated with the kernel-mode component is initialized before other drivers. FIG. 2 illustrates both hardware and software components and processes or operations. The processes or operations are shown numbered in FIG. 2, in order of their occurrence.

As illustrated, a computing device 202 may start a boot phase 204 after a power cycle or reboot. Both an integrity manager driver 206 of an integrity manager and a kernel-mode component driver 208 of a kernel-mode component are initialized early in the boot phase 204, causing the integrity manager and kernel-mode component to be launched before other drivers 210 are initialized by an operating system of the computing device 202. The operating system may initialize the drivers in an order specified by the initialization order 212. To ensure that the integrity manager driver 206 is first in the initialization order 210, the integrity manager driver 206 may be associated with a pre-boot component 214 that is executed by a pre-boot environment 216.

As shown, during a pre-boot phase 218, the pre-boot environment 216 may process 220 the pre-boot component 214, and the pre-boot component 214, when processed 220, ensures 222 that the integrity manager driver 206 is the first driver in the initialization order 212. Next, during the boot phase 204, the operating system initializes 224 the drivers in accordance with the initialization order 212.

In various embodiments, the computing device 202 may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the computing device 202 may distribute the components and processes illustrated in FIG. 2 among the multiple computing devices. In some implementations, the computing device 202 represents one or more virtual machines implemented on one or more computing devices. An example computing device capable of serving as a computing device 202 is illustrated in FIG. 4 and described below with reference to that figure.

The pre-boot phase 218 and the boot phase 204 may be part of a booting process of the computing device 202 following a power cycle or reboot. The pre-boot phase 218 may involve as number of operations of the pre-boot environment 216, which may be a BIOS, an extensible firmware interface (EFI), or other sort of pre-boot environment 216. The pre-boot environment 216 may initialize and test hardware components of the computing device 202 and may select and load an operating system of the computing device 202. Through an interface, the pre-boot environment 216 may also be programmed with other components, such as the pre-boot component 214, which are processed 220 during the pre-boot phase 220. In some embodiments, the interface may utilize one or more security measures. For example, the interface may require a signature or key to be provided with the component. If the signature or key is not provided, the pre-boot environment 216 will not process the pre-boot component 214.

In various embodiments, when the pre-boot component 214 is processed 220, it may ensure 220 that the integrity manager driver 206 is first in the initialization order 212. To ensure 220 that the integrity manager driver 206 is first in the initialization order 212, the pre-boot component 214 may alter the initialization order 212 to place the integrity manager driver 206 first.

The boot phase 204 may follow the pre-boot phase 218 and may involve a number of operations in which a boot loader and a kernel of an operating system of the computing device 202 load and initialize computing device components such as drivers. As described above with respect to FIG. 1, the boot phase 204 may first process dependent DLLs of driver. This processing may follow loading of drivers and their DLLs into memory of the computing device 202. After processing the dependent DLLs, the operating system deletes boot information. The operating system then proceeds to initialize 224 the drivers. The boot phase 204 may also involve other stages or operations besides those illustrated and described. Following the boot phase 204, the computing device 202 may enter into a runtime phase in which the operating system and various components and applications have launched and are running as active processes.

The integrity manager driver 206 may be similar to the integrity manager driver 106 described above, except that the integrity manager driver 206 may not have a library component 114 as a dependent DLL. The kernel-mode component driver 208, other drivers 210, and initialization order 212 may be the same as or similar to the respective kernel-mode component driver 108, other drivers 110, and initialization order 112. Also, the initializing 224 of drivers by the operating system may be the same as or similar to the initializing 128 of drivers by the operating system.

Example Environment

Figure 3:
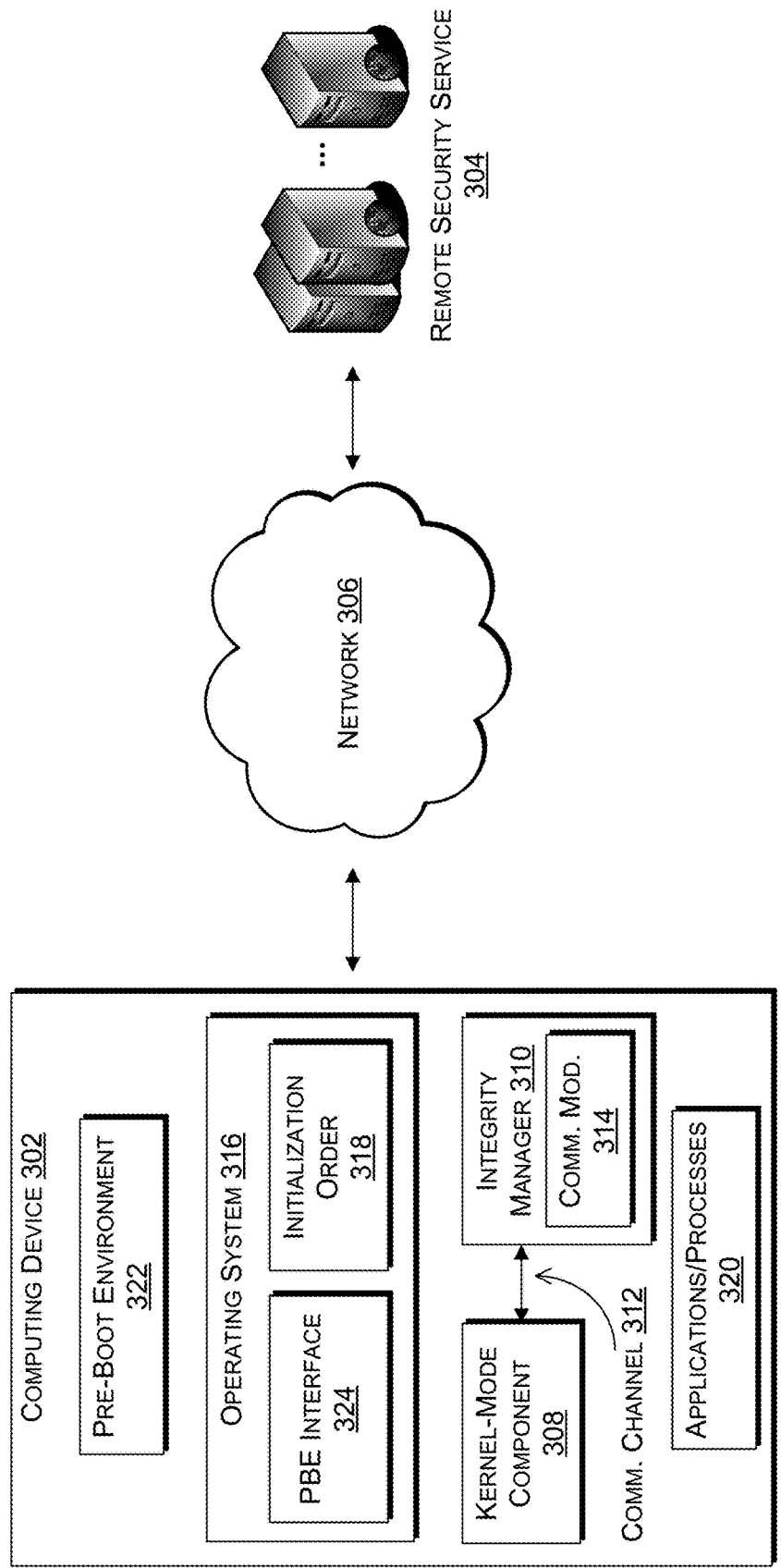
FIG. 3 illustrates an example environment in which a kernel-mode component, during runtime on a computing device, ensures that a driver of the kernel-mode component will be a first driver initialized in a boot phase, configures a pre-boot environment, or generates a security event based on boot phase activity and provides the event to a remote security service.

FIG. 3 illustrates an example environment in which a kernel-mode component, during runtime on a computing device, ensures that a driver of the kernel-mode component will be a first driver initialized in a boot phase, configures a pre-boot environment, or generates a security event based on boot phase activity and provides the event to a remote security service. As illustrated in FIG. 3, a computing device 302 is connected to a remote security service 304 via a network 306. The remote security service 304 provides security services to the computing device 302 through the kernel-mode component 308 and integrity manager 310 that are active on the computing device 302. The kernel-mode component 308 and integrity manager 310 communicate with each other through a communication channel 312, the integrity manager 310 ensuring the integrity of the kernel-mode component 308 and including a communication module 314 for communications with the remote security service 304 when the integrity of the kernel-mode component 308 is compromised. As is further shown, the computing device 302 may include an operating system 316 which utilizes an initialization order 318 is a boot phase and which enables the kernel-mode component 308 and applications or processes 320 to update the initialization order 318. Also, in some embodiments, the computing device 302 may have a pre-boot environment 322, which may be updated by a pre-boot environment interface 324 of the operating system 316.

In various embodiments, the computing device 302 may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the computing device 302 may distribute the components and processes illustrated in FIG. 3 among the multiple computing devices. In some implementations, the computing device 302 represents one or more virtual machines implemented on one or more computing devices. An example computing device capable of serving as a computing device 302 is illustrated in FIG. 4 and described below with reference to that figure.

In further embodiments, the devices implementing the remote security service 304 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the devices implementing the remote security service 304 represent a plurality of computing devices working in communication, such as a cloud computing network of nodes. In some implementations, one or more of the devices implementing the remote security service 304 represent one or more virtual machines implemented on one or more computing devices.

In some embodiments, the remote security service 304 may be a provider of information security services to individual users and client entities, such as maintenance and configuration of the kernel-mode component 308 and integrity manager 310, threat modeling, and/or remediation. The remote security service 304 may receive alerts and security events, either from the kernel-mode component 308 or from the integrity manager 310 via its communication module 314. In response, the remote security service 304 may update a configuration for either or both of the kernel-mode component 308 or the integrity manager 310, may provide instructions to the kernel-mode component 308 or the integrity manager 310, or may take some healing or remediation action.

In various embodiments, the network 306 may include any one or more networks, such as wired networks, wireless networks, and combinations of wired and wireless networks. Further, the network 306 may include any one or combination of multiple different types of public or private networks (e.g., cable networks, the Internet, wireless networks, etc.). In some instances, computing devices communicate over the network 306 using a secure protocol (e.g., https) and/or any other protocol or set of protocols, such as the transmission control protocol/Internet protocol (TCP/IP).

The integrity manager 310 may ensure the integrity of the kernel-mode component 308 during the boot phase of the computing device 302, as described above, and may act as a conduit during runtime for information retrieved or alerts generated during the boot phase. For example, the integrity manager 310 may generate an alert when the integrity manager 310 alters the initialization order 318 and may provide that alert to the kernel-mode component 308 via the communication channel 312. Alternatively, the integrity manager 310 may provide the information or alerts to the remote security service 304 via the communication module 314 if, for instance, the integrity manager 310 determines one or more conditions are met that indicate the kernel-mode component 308 may be compromised. The communication module 314 may interface with one or more transceivers of the computing device 302, such as wired or wireless communication transceivers (e.g., WiFi transceiver) to communicate the alerts or information.

As mentioned above, the kernel-mode component 308 may monitor and record activity on the computing device 302, may analyze the activity, and may generate alerts and events and provide those alerts and events to the remote security service 304. The kernel-mode component 308 may be installed by and configurable by the remote security service 304, receiving, and applying while live, reconfigurations of the kernel-mode component 308. An example kernel-mode component 308 is described in greater detail in U.S. patent application Ser. No. 13/492,672, entitled "Kernel-Level Security Agent" and filed on Jun. 8, 2012.

In various embodiments, the information received from the integrity manager 310 over the communication channel 312 may include boot information, such as boot information from a loader parameter block of a boot loader of the operating system 316. Such boot information may include a list of boot drivers, copies of boot drivers, and boot driver information (size in memory, signatures, etc.). By receiving the list of boot drivers, copies of boot drivers, and/or the boot driver information from the integrity manager 310, the kernel-mode component 308 is able to have a complete picture of the drivers loaded into memory on the computing device 302. The operating system 316 may notify the kernel-mode component 308 of the other drivers loaded into memory, but the boot drivers are loaded into memory by the boot loader, before operating system kernel initialization, and the operating system 316 is thus unable to notify the kernel-mode component 308 of the boot drivers. The received information may be stored by the kernel-mode component 308 (e.g., in a model or other sort of data store), utilized in analysis, or provided by the kernel-mode component 308 to the remote security service 304.

Likewise, alerts received from the integrity manager 310—or events generated by the kernel-mode component 308 based on those alerts—may also be stored by the kernel-mode component 308, utilized in analysis, or provided by the kernel-mode component 308 to the remote security service 304. The alerts may also result in the kernel-mode component 308 performing one or more healing or remediation actions.

In some embodiments, the kernel-mode component 308 may also place itself first in the initialization order 318 and may maintain itself as first in the initialization order 318 by intercepting requests from other applications or processes 320 (including from the OS kernel itself (e.g., in the instance of a malicious kernel driver)) to update the initialization order 318. The operating system 316 may enable the kernel-mode component 308 and other applications or processes 320 to access and update the initialization order 318 by requesting, for instance, to have their drivers placed first in the initialization order 318. The kernel-mode component 308 may do exactly this, placing its driver first in the initialization order 318. Then and after, the kernel-mode component 308 may intercept requests from other applications or processes 320 to have their drivers placed first. The kernel-mode component 308 may update those intercepted requests so that the requests seek to have drivers placed after the kernel-mode component driver in the initialization order 318.

Also, in further embodiments, the computing device 302 may have a pre-boot environment 322, which may be the same as or similar to the pre-boot environment 216 described in greater detail herein. To update the pre-boot environment 322, the operating system 316 may provide a pre-boot environment interface 324. The pre-boot environment interface 324 may receive components for the pre-boot environment 322 and may provide those components to the pre-boot environment 322. In some embodiments, the pre-boot environment interface 324 may implement one or more security mechanisms, requiring, for instance, that a key or signature be provided with any components.

Example System

FIG. 4 illustrates a component level view of a computing device configured with a kernel-mode component and with an integrity manager associated with the kernel-mode component. As illustrated, computing device 400 comprises a memory 402 storing an operating system 404, with includes a boot loader 406 and a kernel 408, a kernel-mode component 410, an integrity manager 412, applications and data 414, and drivers 416. Also, computing device 400 includes processor(s) 418, a removable storage 420 and non-removable storage 422, input device(s) 424, output device(s) 426 and communication connections 428 for communicating with other computing devices 430.

In various embodiments, memory 402 is volatile (such as RAM), non-volatile (such as ROM, flash memory, etc.) or some combination of the two. The operating system 404, which its boot loader 406 and kernel 408, may be any sort of operating system. The operating system 404, boot loader 406, and kernel 408 are configured to perform any or all of the operations described above as performed by an operating system, a boot loader or a kernel. The kernel-mode component 410 and integrity manager 412, along with their respective drivers, are described above in detail with respect to FIGS. 1-3. The applications and data 414 and drivers 416 may be any sort of applications and data or drivers, such as the applications, data, or drivers described above in detail with respect to FIGS. 1-3.

In some embodiments, the processor(s) 418 is a central processing unit (CPU), a graphics processing unit (GPU), or both CPU and GPU, or other processing unit or component known in the art.

Computing device 400 also includes additional data storage devices (removable and/or non-removable) such as, for example, magnetic disks, optical disks, or tape. Such additional storage is illustrated in FIG. 4 by removable storage 420 and non-removable storage 422. Tangible computer-readable media may include volatile and nonvolatile, removable and non-removable media implemented in any method or technology for storage of information, such as computer readable instructions, data structures, program modules, or other data. Memory 402, removable storage 420 and non-removable storage 422 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 400. Any such tangible computer-readable media may be part of the computing device 400.

Computing device 400 also has input device(s) 424, such as a keyboard, a mouse, a touch-sensitive display, voice input device, etc., and output device(s) 426 such as a display, speakers, a printer, etc. These devices are well known in the art and need not be discussed at length here.

Computing device 400 also contains communication connections 428 that allow the computing device 400 to communicate with other computing devices 430, such as device (s) the remote security service 304.

Example Processes

FIGS. 5-8 illustrate example processes 500, 600, 700, and 800. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
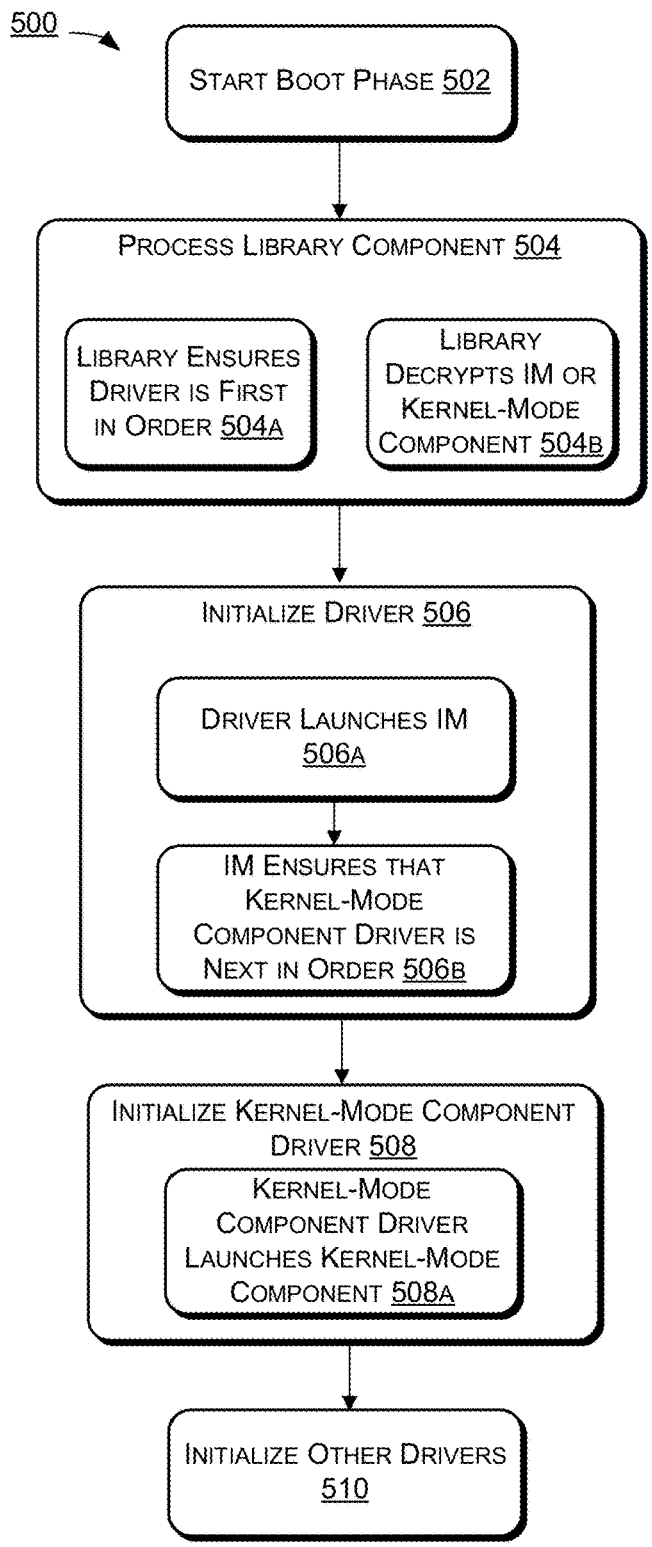
FIG. 5 illustrates an example process for processing a library component associated with a kernel-mode component during a boot phase, before initialization of drivers, the library component ensuring that a driver component associated with the kernel-mode component is initialized before other drivers.

FIG. 5 illustrates an example process for processing a library component associated with a kernel-mode component during a boot phase, before initialization of drivers, the library component ensuring that a driver component associated with the kernel-mode component is initialized before other drivers. The process 500 includes, at 502, starting a boot phase of a computing device in which a boot loader and kernel of an operating system perform loading and initialization tasks following a power cycle or other sort of reboot. The operations shown at 504-510 occur during the boot phase.

At 504, the computing device processes a library component associated with a kernel-mode component. The library component may be a dependent DLL of a driver component and may be processed with other dependent DLLs of drivers. In some embodiments, the order in which the library component and other DLLs are processed may be based on names of the DLLs (e.g., ASCII character strings). At 504a, when processed, the library component ensures that the driver component is to be initialized before other drivers. The ensuring may involve placing a driver of an integrity manager associated with the kernel-mode component first in an initialization order for the drivers. At 504b, the library component also decrypts executables for the integrity manager and kernel-mode component so that they may be launched by their associated drivers.

At 506, the computing device initializes the first driver in the initialization order. Because the library component placed the driver of the integrity manager first, the integrity manager driver is initialized by the operating system of the computing device before other drivers. At 506a, the integrity manager driver launches the integrity manager and, at 506b, the integrity manager ensures that a driver for the kernel-mode component is the next driver in the initialization order after the integrity manager driver.

At 508, the operating system of the computing device initializes the kernel-mode component driver, in accordance with the initialization order. At 508a, the kernel-mode component driver launches the kernel-mode component.

At 510, the operating system of the computing device initializes the other drivers. Because of the activity of library component, the only drivers initialized before the kernel-mode component is launched are the integrity manager driver and the kernel-mode component driver. In some embodiments, library component may even cause the kernel-mode component to be launched before other DLLs are processed.

Figure 6:
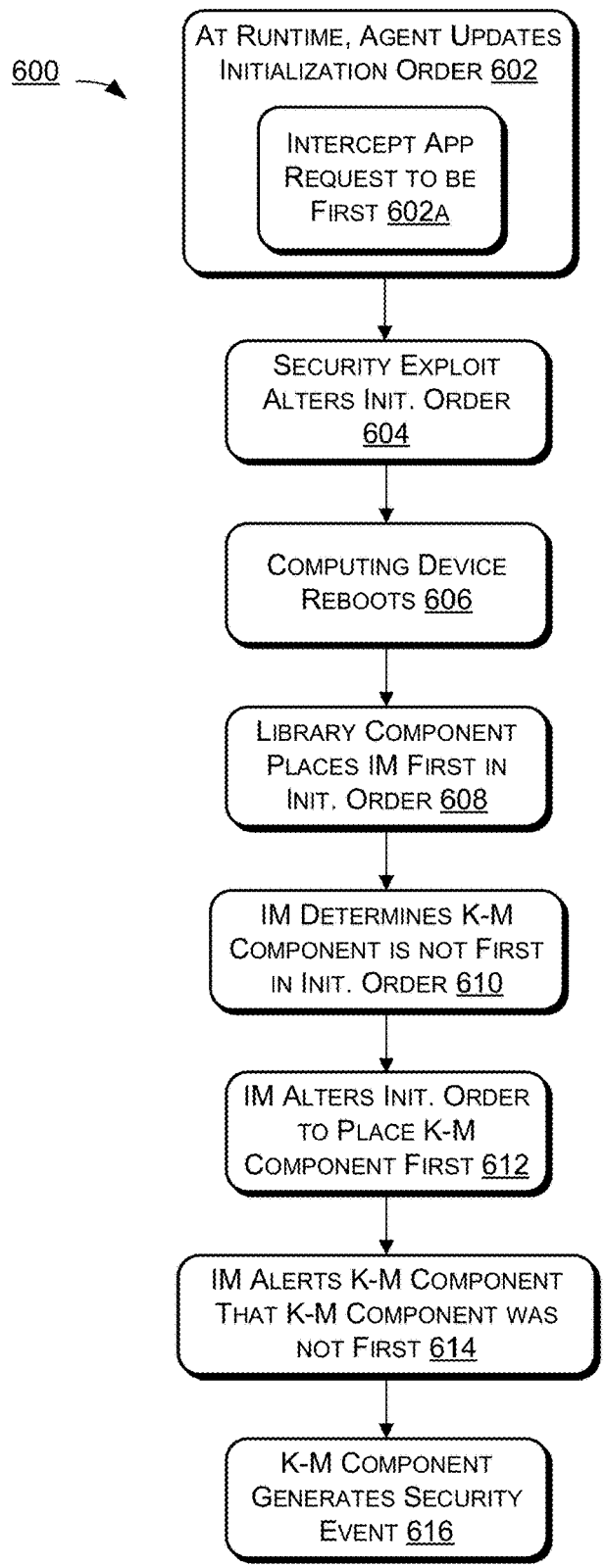
FIG. 6 illustrates an example process for determining that at least one driver is to be initialized before a driver component associated with a kernel-mode component and, in response, altering an initialization order so that the driver component is initialized first and alerting the kernel-mode component that the initialization order was altered.

FIG. 6 illustrates an example process for determining that at least one driver is to be initialized before a driver component associated with a kernel-mode component and, in response, altering an initialization order so that the driver component is initialized first and alerting the kernel-mode component that the initialization order was altered. The process 600 includes, at 602, during a runtime of a computing device, updating, by a kernel-mode component, an initialization order utilized by the operating system in initializing drivers during a boot phase. The kernel-mode component places a driver of the kernel-mode component first in that initialization order. Also, at 602a, the kernel-mode component intercepts request from other applications or processes to place their drivers first in the initialization order and places those drivers after the kernel-mode component driver At 604, a security exploit places another driver first in the initialization order, ahead of the kernel-mode component driver. The security exploit does this without detection by the kernel-mode component.

At 606, the computing device reboots and starts a boot phase. The operations shown at 608-616 occur during the boot phase.

At 608, computing device processes a library component associated with a kernel-mode component, and the library component places a driver of an integrity manager associated with the kernel-mode component first in the initialization order. The library component may be a dependent DLL of the integrity manager driver.

At 610, the computing device, acting in accordance with the initialization order, initializes the integrity manager driver before the other drivers, and the integrity manager driver launches the integrity manager, which determines that the kernel-mode component driver is not first in the initialization order after the integrity manager driver. Rather, the driver placed first by the security exploit would be the next driver after the integrity manager driver.

At 612, in response to determining that the kernel-mode component driver is not next in the initialization order, the integrity manager alters the initialization order to place the kernel-mode component driver as the next driver after the integrity manager in the initialization order.

At 614, the integrity manager alerts the kernel-mode component driver that the kernel-mode component driver was not first after the integrity manager driver, and at 616, the kernel-mode component generates a security event. The kernel-mode component may then provide that event to a remote security service or otherwise update or reconfigure itself to analyze or prevent future activity by the security exploit.

Figure 7:
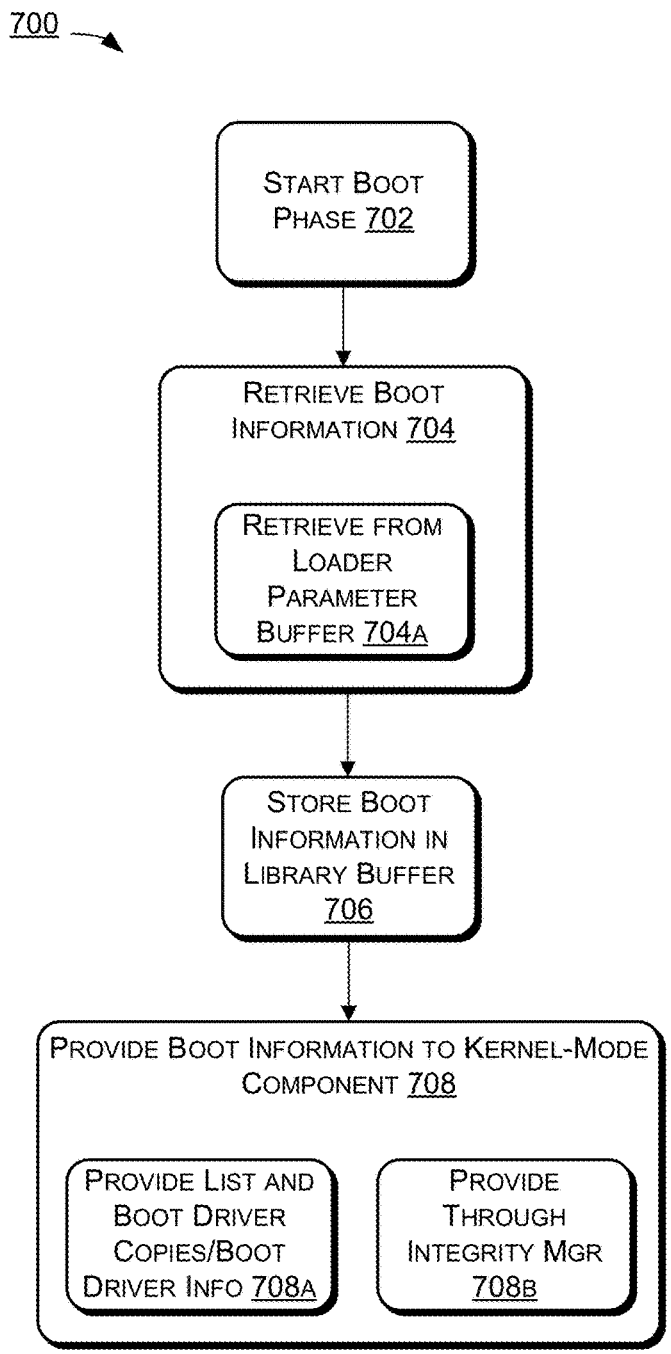
FIG. 7 illustrates an example process for retrieving, during a boot phase and by a component associated with a kernel-mode component, information that is to be deleted by an operating system before initialization of drivers by the operating system and providing the information to the kernel-mode component.

FIG. 7 illustrates an example process for retrieving, during a boot phase and by a component associated with a kernel-mode component, information that is to be deleted by an operating system before initialization of drivers by the operating system and providing the information to the kernel-mode component. The process 700 includes, at 702, starting a boot phase of a computing device in which a boot loader and kernel of an operating system perform loading and initialization tasks following a power cycle or other sort of reboot. The operations shown at 704 and 706 occur during the boot phase, and the operation shown at 708 may occur during the boot phase or at runtime.

At 704, the computing device may process a library component associated with a kernel-mode component, and the library component may retrieve information, such as boot information, that is to be deleted by an operating system of the computing device before initialization of drivers by the operating system. At 704a, the boot information may be retrieved from a loader parameter block of a boot loader of the operating system. The boot information may include at least one of a list of the drivers, an initialization order of the drivers, basic input/output system (BIOS) information, a memory layout, trusted platform module (TPM) information, or a random number generator seed. Also or instead, the boot information may include a list of boot drivers loaded by a boot loader of the computing device.

At 706, the library component may store the information in a buffer of the library component.

At 708, the library component may provide the information to a kernel-mode component. At 708a, the may include providing a list and A) copies of boot drivers and/or B) boot driver information to the kernel-mode component. In some embodiments, at 708b, the providing may include providing the information to an integrity manager, which in turn provides the information to the kernel-mode component.

Figure 8:
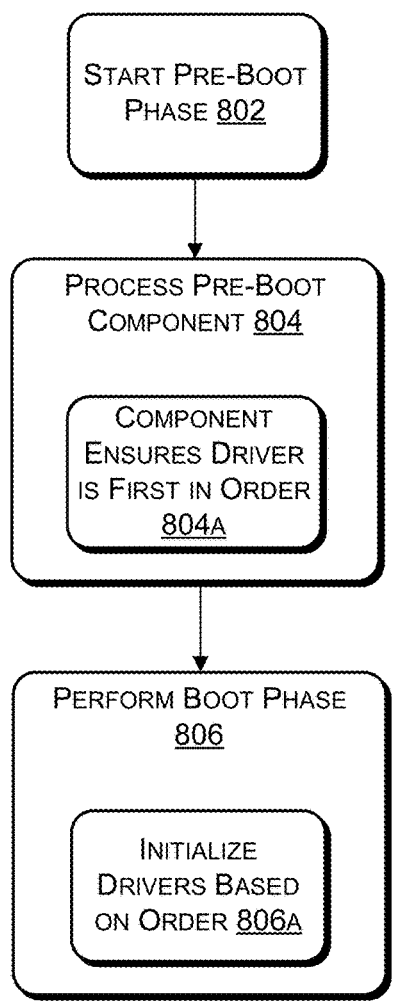
FIG. 8 illustrates an example process for processing a pre-boot component associated with a kernel-mode component during a pre-boot phase, the pre-boot component ensuring that a driver component associated with the kernel-mode component is initialized before other drivers.

FIG. 8 illustrates an example process for processing a pre-boot component associated with a kernel-mode component during a pre-boot phase, the pre-boot component ensuring that a driver component associated with the kernel-mode component is initialized before other drivers. The process 800 includes, at 802, starting a pre-boot phase of a computing device. The pre-boot phase may involve actions taken by a pre-boot environment, such as a BIOS. The pre-boot environment may be associated with an interface which enables configuration of the pre-boot environment with the pre-boot component. The interface may be associated with a security mechanism to prevent configuration of the pre-boot environment with a security exploit.

At 804, the pre-boot environment may process a pre-boot component associated with a kernel-mode component. At 804a, the pre-boot component, when processed, ensures that a driver associated with the kernel-mode component is the first driver initialized by an operating system during a boot phase.

At 806, the computing device performs the boot phase, which includes, at 806a, initializing drivers based on an initialization order. Based on the activity of the pre-boot component, the driver associated with the kernel-mode component is first in that initialization order.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
a processor;
memory; and
a plurality of components stored in the memory and operable by the processor during a boot phase of the computing device, wherein the boot phase is not a pre-boot phase, the components including:
a library component of a driver of an integrity manager associated with a kernel-mode component, the library component to be processed during the boot phase and before initialization of drivers by an operating system of the computing device and which, when processed, ensures that the driver of the integrity manager is a first of the drivers in an initialization order of the drivers utilized by the operating system;
the driver of the integrity manager which, when initialized, causes the computing device to launch the integrity manager; and
the integrity manager which, when launched:
determines that a driver of the kernel-mode component is not next in the initialization order after the driver of the integrity manager; and
alters the initialization order to place the driver of the kernel-mode component next in the initialization order to initialize the driver of the kernel-mode component before initializing remaining ones of the drivers.

2. The computing device of claim 1, wherein the library component is a dependent dynamic link library (DLL) of the driver of the integrity manager.

3. The computing device of claim 1, wherein the library component is associated with a name which causes the library component to be processed before one or more other library components.

4. The computing device of claim 1, wherein the library component decrypts the integrity manager or the kernel-mode component before the driver of the integrity manager is initialized.

5. The computing device of claim 1, wherein the library component causes the driver of the integrity manager to be initialized before processing of one or more other library components.

6. The computing device of claim 1, wherein the driver of the integrity manager includes at least an unloadable part which may be updated without a reboot of the computing device and a non-unloadable part which may not be updated without a reboot of the computing device.

7. A computer-implemented method comprising:
during a boot phase of a computing device, before initialization of drivers by an operating system of the computing device, ensuring that a driver of an integrity manager associated with a kernel-mode component is a first of the drivers in an initialization order of the drivers;

initializing the driver of the integrity manager in order to launch the integrity manager;

determining, by the integrity manager, whether a driver of the kernel-mode component is next in the initialization order after the driver of the integrity manager; and in response to determining that the driver of the kernel-mode component is not next in the initialization order, altering the initialization order to place the driver of the kernel-mode component as a next driver of the drivers to be initialized by the operating system after the driver of the integrity manager, and alerting the kernel-mode component that the initialization order was altered.

8. The method of claim 7, further comprising, during a runtime prior to the boot phase, updating, by the kernel-mode component, the initialization order of the drivers to place the driver of the kernel-mode component as the first driver to be initialized by the operating system.

9. The method of claim 8, wherein, after the updating and prior to the boot phase, a security exploit alters the initialization order such that at least one driver of remaining ones of the drivers is to be initialized before the driver of the kernel-mode component.

10. The method of claim 8, further comprising, during the runtime, intercepting, by the kernel-mode component, a request to place a particular driver of remaining ones of the drivers as the first driver in the initialization order, and, in response, placing the particular driver after the driver of the kernel-mode component in the initialization order.

11. The method of claim 7, wherein the alerting is performed at a runtime subsequent to the boot phase, and the kernel-mode component generates a security event responsive to being alerted.

12. The method of claim 7, wherein the determining, the altering, and the alerting are performed by the integrity manager.

13. The method of claim 12, wherein the ensuring that the driver of the integrity manager is the first of the drivers in the initialization order comprises altering, by a library component associated with the driver of the integrity manager, the initialization order to place the driver of the integrity manager first in the initialization order.

14. A computer-implemented method comprising:

during a boot phase of a computing device, wherein the boot phase is not a pre-boot phase, retrieving, by a dependent dynamic link library (DLL) associated with a kernel-mode component, information that is to be deleted by an operating system of the computing device before initialization of drivers by the operating system; and providing, by the dependent DLL, the information to the kernel-mode component.

15. The method of claim 14, wherein the information is boot information associated with a boot loader of the computing device.

16. The method of claim 15, wherein the retrieving comprises retrieving the boot information from a loader parameter block of the boot loader.

17. The method of claim 15, wherein the boot information includes at least one of a list of the drivers, an initialization order of the drivers, basic input/output system (BIOS) information, a memory layout, trusted platform module (TPM) information, or a random number generator seed.

18. The method of claim 14, wherein the information includes a list of boot drivers loaded by a boot loader of the computing device.

19. The method of claim 18, wherein the providing comprises providing the list of boot drivers and A) copies of boot drivers or B) boot driver information to the kernel-mode component.

20. The method of claim 14, wherein the dependent DLL is a dependent DLL of an integrity manager associated with the kernel-mode component, and the providing comprises providing the information to the integrity manager, which in turn provides the information to the kernel-mode component.

21. The method of claim 20, wherein the dependent DLL includes a buffer to store the information prior to initialization of the integrity manager.

22. A computer storage device having stored thereon a plurality of components operable by a processor of a computing device during a pre-boot phase of the computing device, the components comprising:

a pre-boot environment to process a pre-boot component associated with a kernel-mode component;

the pre-boot component which, when processed, ensures that a driver of an integrity manager associated with the kernel-mode component is a first driver in an initialization order of drivers utilized by an operating system during a boot phase;

the driver of the integrity manager which, when initialized, causes the computing device to launch the integrity manager;

the integrity manager which, when launched:
determines that a driver of the kernel-mode component is not next in the initialization order after the driver of the integrity manager; and
alters the initialization order to place the driver of the kernel-mode component next in the initialization order to initialize the driver of the kernel-mode component before initializing other drivers that are to be initialized by the operating system; and the kernel-mode component which, when launched, is configured to monitor activity on the computing device and provide security events associated with the activity to a remote security service.

23. The computer storage device of claim 22, wherein the pre-boot environment is associated with an interface which enables configuration of the pre-boot environment with the pre-boot component.

24. The computer storage device of claim 23, wherein the interface is associated with a security mechanism to prevent configuration of the pre-boot environment with a security exploit.

25. The computing device of claim 1, wherein the kernel-mode component, when launched, is configured to monitor activity on the computing device and provide security events associated with the activity to a remote security service.

26. The computing device of claim 1, wherein the library component is configured to ensure that the driver of the integrity manager is the first of the drivers in the initialization order by altering the initialization order to place the driver of the integrity manager first in the initialization order.

27. The computing device of claim 1, wherein the integrity manager, in response to altering the initialization order, is configured to alert the kernel-mode component that the initialization order was altered.

28. The computing device of claim 27, wherein the kernel-mode component, in response to the alert from the integrity manager, is configured to generate a security event and send the security event to a remote security service.

* * * * *